United States Patent
Ramesh et al.

(10) Patent No.: US 12,235,634 B2
(45) Date of Patent: Feb. 25, 2025

(54) MANAGING SECURITY OF ENCLOSURE BASED ON A TASK STATUS AND GEOGRAPHICAL LOCATION OF THE ENCLOSURE

(71) Applicant: Hewlett Packard Enterprise Development LP, Houston, TX (US)

(72) Inventors: Bharath Ramesh, Houston, TX (US); Justin York, Cypress, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 730 days.

(21) Appl. No.: 17/475,706

(22) Filed: Sep. 15, 2021

(65) Prior Publication Data

US 2023/0251643 A1    Aug. 10, 2023

(51) Int. Cl.
*G05B 23/02*      (2006.01)
*G06F 21/86*      (2013.01)
*H04W 4/02*       (2018.01)

(52) U.S. Cl.
CPC ......... *G05B 23/0205* (2013.01); *G06F 21/86* (2013.01); *H04W 4/025* (2013.01)

(58) Field of Classification Search
CPC ..... G05B 23/0205; G06F 21/86; H04W 4/025
See application file for complete search history.

(56) References Cited

U.S. PATENT DOCUMENTS

| | | | |
|---|---|---|---|
| 10,966,050 B1* | 3/2021 | Gu | .......................... H04L 63/20 |
| 2002/0124067 A1 | 9/2002 | Parupudi et al. | |
| 2007/0239321 A1 | 10/2007 | McAden | |
| 2015/0026801 A1* | 1/2015 | Rossigneux | ........... G08B 29/18 726/22 |
| 2015/0324616 A1* | 11/2015 | Alarabi | ................... G06F 21/88 726/25 |
| 2015/0350841 A1 | 12/2015 | Dal Santo et al. | |
| 2018/0040224 A1 | 2/2018 | Barcala et al. | |

* cited by examiner

*Primary Examiner* — Ricky Go
(74) *Attorney, Agent, or Firm* — Hewlett Packard Enterprise Patent Department (57) ABSTRACT

Examples described herein relate to a system and method for managing the security of an edge enclosure. The edge enclosure is deployed in a mobile environment and travels between a base location and a task location to perform a task. The task is defined and configured at a chassis manager by a management device. A server in the edge enclosure processes data associated with the task. The chassis manager detects a loss of communication between the chassis manager and the management device. The chassis manager performs a security action based on task status. The task status is either ongoing or completed. The security action performed at the edge enclosure protects the data present in the server from tampering. The management device transmits alerts to the customers of the edge enclosure after the task is completed.

19 Claims, 6 Drawing Sheets

MANAGING SECURITY OF ENCLOSURE BASED ON A TASK STATUS AND GEOGRAPHICAL LOCATION OF THE ENCLOSURE

BACKGROUND

Edge devices provide mobility, analytics, and high-performance computing. The edge devices process data at edge locations and aid users in real-time decision-making. Further, the edge devices are typically deployed in remote locations with limited connectivity to process a large amount of data associated with applications and provide local users with relevant insights.

BRIEF DESCRIPTION OF THE DRAWINGS

The following detailed description references the drawings, wherein.

Throughout the drawings, identical reference numbers may designate similar, but not necessarily identical, elements. The figures are not necessarily to scale; and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

The following detailed description refers to the accompanying drawings. Wherever possible, same reference numbers are used in the drawings and the following description to refer to the same or similar parts. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

The terminology used herein is for the purpose of describing particular examples and is not intended to be limiting. As used herein, the singular forms "a," "an," and "the" are intended to include the plural forms as well, unless the context clearly indicates otherwise. The term "another," as used herein, is defined as at least a second or more. The term "coupled," as used herein, is defined as connected, whether directly without any intervening elements or indirectly with at least one intervening element, unless indicated otherwise. For example, two elements can be coupled mechanically, electrically, or communicatively linked through a communication channel, pathway, network, or system. Further, the term "and/or" as used herein refers to and encompasses any and all possible combinations of the associated listed items. As used herein, the term "includes" means includes but is not limited to, the term "including" means including but not limited to. The term "based on" means based at least in part on.

Edge devices (e.g., edge servers) may be deployed to process data in remote locations, for example, on a cruise ship or a naval vessel. A base location such as a port, an edge device may provide a hard-wired Ethernet or Wi-Fi local area network (LAN) connection for the edge device to connect to the Internet and central management service. However, on leaving the base location, the Wi-Fi connection is no longer available, and the edge device may lose connectivity with the central management service. Alternate wide area network (WAN) options (e.g., 5G/LTE) are expensive and the edge device may only use these for emergency transmissions. The edge device may be sent on a mission to a remote location to process data. As used herein, a "mission" is when the edge device is transported from a first location to perform one or more tasks. For example, the mission may be a search and rescue operation in which the edge device may be used for processing data. In the case the edge device is lost or captured during the mission and has lost connectivity to the central management service, the data on the edge device may be stolen or compromised. Further, if preventive measures are not enabled at the edge device, the data present on the edge device may be stolen or tampered with. However, enabling the preventive measures every time there is a loss of connectivity may be futile as there are chances that the edge device may frequently lose connectivity with the central management service during the mission in remote locations.

At the central management service, any loss of connectivity with the edge device may result in the assignment of an emergency status (e.g., high alert) to the edge device. Further, the central management service may transmit an alert to a customer indicating that the edge device is not reachable and potentially missing. The central management service may be configured to alert the customer each time the connectivity is lost with the edge device. In remote locations, when the edge device is mobile and processing data during the mission, the edge device may lose connectivity frequently. This frequent loss of connectivity may result in the transmission of multiple alerts to the customer. As temporary loss of connectivity to the edge device is expected during the mission, the customer may choose to ignore the alerts and consider them as spurious and unnecessary. However, if these alerts are routinely ignored, potentially genuine alerts resulting from loss or theft of the edge device may be missed by the customer.

Therefore, in accordance with the aspects of the present disclosure, a method and system for managing the security of an edge enclosure at remote locations are presented. The edge enclosure may be mounted on a vehicle that moves the edge enclosure from a base location to a task location while performing a task. As used herein the term "task" refers to an operation being executed by a server deployed in the edge enclosure. Examples of the operation may include, but are not limited to, seismic activity monitoring, industrial monitoring, search and rescue activities, military surveillance, and exploration of offshore natural resources. The status of the task being performed may be monitored by a chassis manager of the edge enclosure. The status of the task may be ongoing (e.g., being performed) or the task is completed. The status of the task may be determined using information including, but not limited to, a task initiation time, a task completion time, or a task timer. The task initiation time, the task completion time, and operation of the task timer may be pre-defined for specific tasks. In some examples, a management device managing the task for a customer may define the task initiation time, the task completion time, and the operation of the task timer. The task initiation time is the starting time of the task and the task completion time is a time at which the task is defined to end. The task timer is associated with a task duration defined for performing the task. The chassis manager and the management device may be configured with task details and information used for determining the task status.

In some examples, the chassis manager in the edge enclosure may be configured to manage the security of the edge enclosure and perform the security action at the edge enclosure, To that end, the chassis manager may receive the geographical location associated with the edge enclosure from the receiver. Further, the chassis manager may detect the loss of communication with the management device. In response to detecting the loss of communication, the chassis manager may determine the security action to be performed based on the status of the task and the geographical location of the edge enclosure. The security action may protect the data present in the server from being stolen or tampered with. Further, the security action may inhibit the usage of the server itself.

As the chassis manager considers both the status of the task and the geographical location before performing the security action, preventive measures may be enabled less frequently at the edge enclosure and the server. For example, in case the status of the task is ongoing in the task location, any loss of communication between the chassis manager and the management device may be ignored. In case the status of the task is completed, and the geographical location of the edge enclosure indicates that the edge enclosure is not back to the base location after the task is completed, the security action may be performed.

Additionally, at the management device that communicates with the edge enclosure, alerts are sent to customers after the task completion time. Further, an additional buffer time may be defined after the task completion time before transmission of the alerts to the customers. The task completion time at the management device is a predicted time by which the task is to be completed. The task completion time and the additional time after the task is completed may be used for determining an emergency (e.g., the edge enclosure is lost). The use of task completion time and the additional time after the task completion time for detecting the emergency may prevent spurious alerts from being sent to the customer from the management device.

Figure 1:
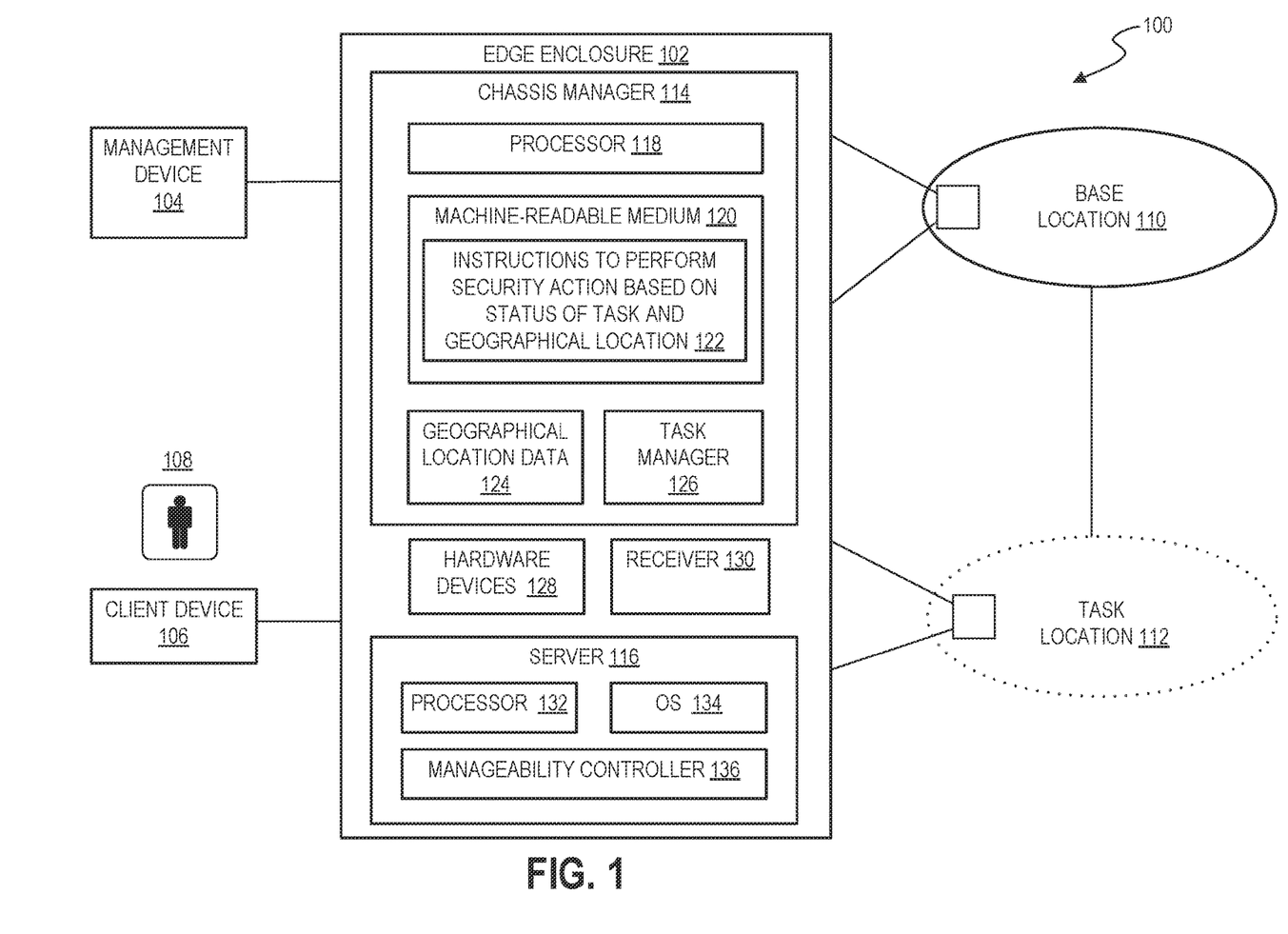
FIG. 1 is a block diagram of an example system for managing security of an edge enclosure.

Referring now to figures, FIG. 1 depicts a block diagram of an example system 100 for managing the security of an edge enclosure 102. The system 100 includes the edge enclosure 102 that is in communication with a management device 104 and an end-user 108 via a client device 106. As used herein, the term edge enclosure refers to an enclosure deployed at remote locations. The edge enclosure includes edge devices/servers, sensors, networking devices, Uninterrupted Power Supply (UPS) device, and a ruggedized body to handle water, air and dust along with extreme humidity and temperature changes. In some examples, the edge enclosure may include edge servers that process data at remote locations. The edge enclosure 102 may include a chassis manager 114, a server 116, and one or more hardware devices 128 that are connected to the edge enclosure 102. The edge enclosure 102 with the server 116 forms a rugged server system that can be used in extreme environmental conditions. The edge enclosure 102 may be used in a mobile environment in which the edge enclosure 102 moves from a base location 110 to a task location 112 for performing a task. In some cases, a vehicle may be used for moving the edge enclosure 102 from the base location 110 to the task location 112 and vice-versa. Once the task is completed, the edge enclosure 102 may return to the base location 110.

The task may be an operation being executed by the server 116 deployed in the edge enclosure 102. In an example, the server 116 may be processing data associated with a military surveillance operation (e.g., task) in a desert. The edge enclosure 102 with the server 116 may move between the base location 110 and the task location 112 in the desert on a vehicle such as a tank. Although FIG. 1 shows a single task location 112, it should be understood that the edge enclosure 102 may travel to multiple task locations. The task location 112 refers to a geographical area at which the server 116 collects data and/or processes data related to the task.

In some examples, the management device 104 may be a central controller that communicates with the edge enclosure 102 and the server 116. In some examples, the management device 104 may include a centralized management service for managing the process of deployment and/or configuration of the edge enclosure 102. The centralized management service of the management device 104 may configure the edge enclosure 102 and the server 116 for performing tasks in remote locations. In some examples, the management device 104 may be installed at a customer site to allow customers to configure and/or manage the components of the edge enclosure 102 remotely.

In some examples, the management device 104 may be in communication with the edge enclosure 102 via a centralized management service to receive alerts and information of events occurring at the edge enclosure 102. In some examples, the management device 104 may receive health data of the hardware devices 128 from the chassis manager 114 and the server 116. Further, the management device 104 may transmit data and alerts to the customer of the edge enclosure 102. In some examples, the customer of the edge enclosure 102 may be a centralized security professional responsible for the security of the task. The customer of the edge enclosure 102 may be different from the end-user 108 who may be in communication with server 116 in the edge enclosure 102 via the client device 106 while the task is being performed.

The end-user 108 may be present at the base location 110 or near the task location 112. The end-user 108 communicates with the chassis manager 114 and the server 116 via the network using the client device 106. The network available at the edge enclosure 102 may include, but is not limited to, a wired Ethernet, a Wi-Fi, a private 5G network, a satellite network, and any other networks that are available at the geographical area of the edge enclosure 102. The edge enclosure 102 may be connected via an inexpensive Wi-Fi at the base location 110. However, the network to be used, by the edge enclosure 102 in task location 112 with limited connectivity options, may be preconfigured based on cost, a priority assigned to information being transmitted from the server 116, or simply the availability of the network.

In some examples, the chassis manager 114 may be a lead chassis manager that is in communication with a group of chassis. The chassis manager 114 may be an embedded system management hardware and software solution to manage the server 116, networking, and the hardware devices 128 within the edge enclosure 102. The chassis manager 114 may perform inventory collection, configuration, monitoring tasks, and enable alerts for events on the server 116, and other components in the edge enclosure 102. Certain functionalities of the edge enclosure 102 may be managed and monitored by the chassis manager 114. In some examples, the chassis manager 114 may be plugged into a modular blade chassis and powered by the power supply of the edge enclosure 102.

In some examples, the chassis manager 114 may be communicatively coupled to the hardware devices 128 at the edge enclosure 102. Examples of the hardware devices 128 may include the server 116, power supplies, input/output (I/O) devices, cooling devices, administration modules, and other devices. In some cases, the edge enclosure 102 may support UPS to ensure that power to the server 116 and networking devices is maintained during the task. The edge enclosure 102 may provide power, cooling, networking, and access to the hardware devices 128 for the server 116.

In some examples, the chassis manager 114 may receive geographical location data 124 (e.g., global positioning data such as location coordinates) of the edge enclosure 102 from a receiver 130 that is mounted on the edge enclosure 102. Examples of the receiver 130 may include, but are not limited to, a Global Navigation Satellite System (GLASS) receiver and a Global Positioning System (GPS) receiver. The chassis manager 114 may periodically request the geographical location data 124 from the receiver 130. In one example, on receiving the request, the receiver 130 may deliver the geographical location data 124 to the chassis manager 114. In other examples, other types of location data may be used, for example, cell tower triangulation, wireless communication triangulation, etc. In some examples, the geographical location data 124 may include information such as latitude, longitude, altitude, and time. In some examples, the chassis manager 114 may use the geographical location data 124 to calculate and derive additional information such as the acceleration and speed of a vehicle carrying the edge enclosure 102. This additional information may be used by the server 116 while performing the task. In some examples, the additional information may be combined with information from other sensors, such as an accelerometer, to detect events at the task location 112. For example, when the edge enclosure 102 is mounted on a vehicle, the geographical location, the additional information, and the information from the other sensors may be used by the chassis manager 114 for detecting a fall of the vehicle into a roadside ditch.

In some examples, the chassis manager 114 may be communicatively coupled to the server 116. The server 116 may be a self-contained computing device on at least one mountable board. The server 116 may also be referred to as an edge server or an edge server. In some examples, the server 116 in the edge enclosure 102 may be dedicated to processing data related to a single task or multiple tasks. In some examples, the server 116 may be configured by the management device 104 to operate in a restricted mode when the edge enclosure 102 leaves the base location 110. During the restricted mode operation, a processor of the server 116 may disable access to the OS 134 and login to the manageability controller 136 when the edge enclosure 102 leaves the base location 110. This type of configuration of the edge enclosure 102 may provide an additional layer of security to the server 116 when the edge enclosure 102 is captured or lost while performing the task. Further, the server 116 may include a processor 132 and an operating system (OS) 134, and a manageability controller 136.

In some examples, the OS 134 may be a collective management software application managing the operation of the server 116. For example, the OS 134 may include a set of functional programs that control and manage operations of the devices connected to the server 116. The set of application programs may provide certain utility software for the user to manage the server 116. Examples of the OS 134 may be any of the commercial operating systems, such as Microsoft Windows®, LINUX®, UNIX®, or any other operating system. The OS 134 may run applications that process data associated with the task during the task duration The OS 134 may act as an intermediary between the hardware devices 128 and the applications executing on the server 116.

In some examples, the manageability controller 136 can be used to implement services for the server 116. The manageability controller 136 may provide so-called "lights-out" functionality for the server 116. The lights-out functionality may allow a user, such as a systems administrator, to perform management operations on the server 116 even if the OS 134 is not installed or not functional on the server 116. The manageability controller 136 may also provide so-called "out-of-band" services, such as remote console access, remote reboot, monitoring the health of the server 116, access to server logs, and the like. The manageability controller 136 has management capabilities for sub-systems of the server 116 and is separate from the processor that executes the OS 134 of the server 116. The manageability controller 136 may include an interface, such as a network interface, and/or serial interface that an administrator can use to remotely communicate with the manageability controller 136. In some examples, sensors associated with the manageability controller 136 can measure internal physical variables such as humidity, temperature, power supply voltage, communications parameters, fan speeds, operating system functions, or the like. Although FIG. 1 shows a single server 116 for purposes of illustration and explanation, it should be understood that the edge enclosure 102 may support multiple servers. Further, it is to be noted that FIG. 1 shows the manageability controller 136 for the server 116 for illustration and explanation purposes. In some other examples, there may be additional servers hosted on the edge enclosure 102 that may include respective manageability controllers or other components that may perform operations similar to the manageability controller 136 of the server 116.

In some examples, the chassis manager 114 may transmit the geographical location to the manageability controller 136 of the server 116 using an Ethernet-based Out of Band (OOB) communication channel using an OOB service provided by the manageability controller 136. Further, in some examples, the chassis manager 114 may share the geographical location with other devices, such as other edge enclosures (not shown) present at the same geographical location.

In some examples, the chassis manager 114 may include a task manager 126. The task manager 126 may be configured by the management device 104 before being deployed at remote locations. The task manager 126 may include details associated with the task being processed by the server 116. For example, the task manager 126 may include details such as the task location 112, the task initiation time, the task completion time, and the task duration.

The chassis manager 114 may be configured to monitor the progress of the task being processed by the server 116 and determine the task status at any given instance of time. The chassis manager 114 may determine the status associated with the task based on the information associated with the task. The task manager 126 may store details of the task and information that may be used for determining the status of the task at the chassis manager 114. The status of the task may be "ongoing" or "completed". The information used for determining the task status may include the task initiation time, the task completion, and the task timer. In some examples, the chassis manager 114 may maintain the task timer based on the task duration. The task timer is activated based on the task initiation time and may stop as per the task completion time.

The chassis manager 114 may be implemented using a processor 118 and a machine-readable medium 120. The processor 118 of the chassis manager 114 may be implemented as one or more microprocessors, microcomputers, microcontrollers, digital signal processors, central processing units, state machines, logic circuitries, and/or any devices that manipulate signals based on operational instructions. The machine-readable medium 120 may include any non-transitory computer-readable medium including, for example, volatile memory (e.g., RAM), and/or non-volatile memory (e.g., EPROM, flash memory, a hard disk drive, etc.). The processor 118 may be configured to execute instructions 122 (e.g., programming or software code) stored in the machine-readable medium 120 to perform functions related to managing the security of the edge enclosure 102. The processor 118 is communicatively coupled to the server 116 that is being used for processing data related to a task assigned to the server 116.

The instructions 122 when executed cause the processor 118 to perform a security action based on the status of the task and the geographical location of the edge enclosure 102. Although FIG. 1 shows only one instruction, it should be understood that several instructions may be stored in the machine-readable medium 120. During operation, if the chassis manager 114 detects a loss of communication with the management device 104, the chassis manager 114 may perform a security action based on the status of the task and the geographical location of the edge enclosure 102. Additional details on using the status of the task and the geographical location for performing security action are described in conjunction with FIGS. 3 and 4.

Figure 2:
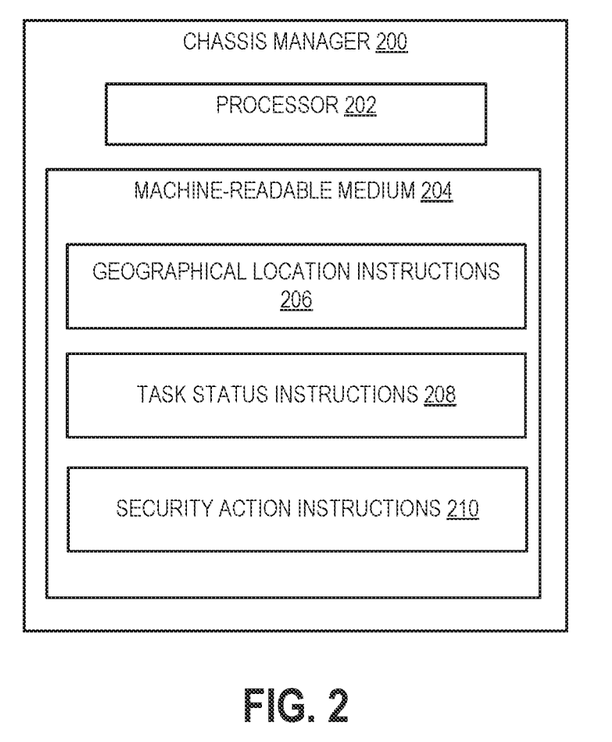
FIG. 2 is a block diagram of an example chassis manager.

FIG. 2 is a block diagram of an example chassis manager 200. The chassis manager 200 may be an example representative of the chassis manager 114 of the edge enclosure 102 depicted in FIG. 1. In some examples, the chassis manager 200 may include a processor 202 operatively coupled to a machine-readable medium 204 storing executable program instructions. The processor 202 may be configured for managing security of the edge enclosure 102 that keeps moving between a base location and multiple task locations. The processor 202 may be an example representative of the processor 118 described in FIG. 1. Similarly, the machine-readable medium 204 may be an example representative of the machine-readable medium 120 described in FIG. 1. The machine-readable medium 204 may be encoded with executable instructions 206, 208, and 210, (hereinafter collectively referred to as instructions 206-210) for managing security, of an edge enclosure, such as, the edge enclosure 102. For illustration purposes, FIG. 2 is explained in conjunction with FIG. 1.

The processor 202 may be configured to execute instructions 206-210 (e.g., programming or software code) stored in the machine-readable medium 204. In certain examples, as an alternative or in addition to retrieving and executing the instructions 206-210, the processor 202 may include at least one integrated circuit, other control logic, other electronic circuits, or combinations thereof that include a number of electronic components for performing the functionalities intended to be performed by the chassis manager 200.

The instructions 206, when executed by the processor 202, may cause the processor 202 to receive the geographical location from a receiver such as the receiver 130. The instructions 208, when executed by the processor 202, may cause the processor 202 to determine the status of the task being performed at the edge enclosure 102. In some examples, the chassis manager may start monitoring the status of the task as soon as the task is initiated. The time for task initiation is stored as the task initiation time in a task manager.

The instructions 210, when executed by the processor 202, may cause the processor 202 to perform a security action at the edge enclosure 102. The security action enables protective measures at the edge enclosure 102 to protect the data being processed by the server 116 from being stolen or tampered with. The chassis manager 200 may perform the security action based on the status of the task and the geographical location of the edge enclosure 102. In some examples, the chassis manager 114 may perform the security action if the edge enclosure 102 is not back to the base location 110 after the task is completed. In some examples, the chassis manager 114 may perform the security action when the edge enclosure 102 is outside a task boundary defined for the task. The task boundary refers to a geographical location (e.g.; the task location 112) in which the edge enclosure 102 can move while performing the task. When the edge enclosure 102 moves outside the task boundary, it may indicate that the edge enclosure 102 may be captured. Additional details regarding the operations performed by the chassis manager 200 are described in conjunction with example methods of FIGS. 3 and 4.

Figure 3:
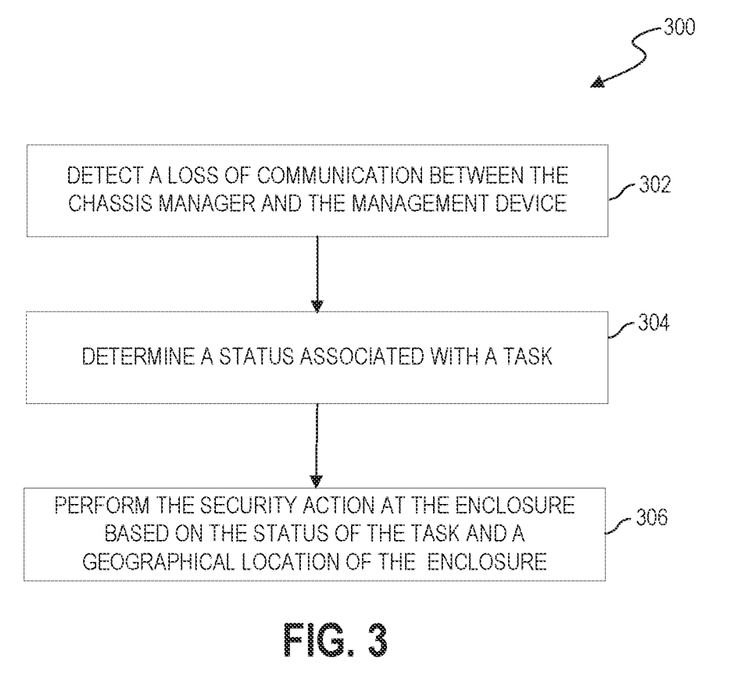
FIG. 3 is a flow diagram of an example method for managing security of the edge enclosure.

FIG. 3 is a flow diagram of an example method 300 for managing the security of an edge enclosure such as the edge enclosure 102 of FIG. 1. The method 300 may be implemented in the form of executable instructions stored on a machine-readable medium 120 and executed by a processor 118 in the chassis manager 114 described earlier. For illustration purposes, the method 300 is described in conjunction with FIG. 1. In some implementations; one or more blocks of the method 300 may be executed concurrently or in a different order than shown. In some implementations, the method 300 may include more or fewer blocks than are shown. Further, in some other implementations, one or more of the blocks of the method 300 may, at certain times, be ongoing and/or may repeat. Furthermore, in some implementations; blocks of the method 300 may be combined.

At block 302, the chassis manager 114 may determine a loss of communication between the chassis manager 114 and the management device 104. During operation, the edge enclosure 102 moves to the task location 112 where the chassis manager 114 may not have access to the Internet or may frequently lose the Internet connectivity during the task. On losing the Internet connectivity, the edge enclosure 102 may also lose connectivity with the management device 104. The chassis manager 114 may be configured to transmit the geographical location to the management device 104 periodically. In some examples, when transmission of data packets with the geographical location to the management device 104 fails, the chassis manager 114 determines that there is a loss of connectivity with the management device 104. The loss of connectivity may happen when there is a limited network range at the task location 112. Further, in some examples, the edge enclosure 102 may be programmed to use only specific networks and the edge enclosure 102 may not be allowed to connect to expensive networks such as the 5G network.

At block 304, the chassis manager 114 determines the status of the task being performed at the edge enclosure 102. The chassis manager 114 may use information related to the task such as the task initiation time, the task completion time, and the task timer to determine the status of the task.

In an example, the chassis manager 114 may determine that the status of the task is ongoing based on the task timer. The chassis manager 114 uses the task timer to determine if the loss of communication is during the ongoing task or after the task is completed. If the task timer is active, the task is in progress and the status of the task is considered as ongoing. If the task timer is not active, the status of the task is considered as completed.

At block 306, the chassis manager 114 may perform a security action based on the status of the task and the geographical location of the edge enclosure 102. For example, if the task status indicates that the task is completed and the chassis manager 114 determines that the edge enclosure 102 is not at the base location 110, the chassis manager 114 may perform a security action at the edge enclosure 102. Examples of the security action that can be performed may include, but is not limited to, powering off the server 116, preventing network access to the server 116, and disabling the internal switch port associated with the server 116. In some examples, the security action performed at the edge enclosure 102 may be reversed when the chassis manager 114 is connected to the management device 104 from the base location 110. In some examples, the reversal of the security action may be performed only from the base location 110.

As the chassis manager 114 considers both the geographical location and status of the task before performing a security action, false preventive actions at the edge enclosure 102 may be reduced. In some examples, if the geographical location indicates that edge enclosure 102 is back at the base location 110, the loss of connectivity with the management device 104 may be ignored. The loss of connectivity from the base location 110 may be due to other issues at the base location 110 and the chassis manager 114 may not perform the security action.

In some examples, the chassis manager 114 may modify an operating parameter of a hardware device 128 connected to the edge enclosure 102. In some examples, the management device 104 may configure the edge enclosure 102 to modify the operating parameter of the hardware device 128 in the task location 112. The chassis manager 114 may detect that the edge enclosure 102 is present at the task location 112 and modify the operating parameter of one or more hardware devices 128. For example, in a military operation, the edge enclosure 102 may be mounted on a UAV and the edge enclosure 102 may move to the task location 112 using the UAV. At the task location 112, the chassis manager 114 may be configured to maintain an allowable noise threshold to reduce the noise from the UAV and the edge enclosure 102. The allowable noise threshold provides a value for noise generated by the edge enclosure 102 and its components. The allowable noise threshold may help in preventing the detection of edge enclosure 102 by any adversaries at the task location 112. In some examples, the chassis manager 114 may throttle the performance of the processor and peripherals such as Dual Inline Memory Module (DIMM) so that the fans of the edge enclosure 102 may run slower and quieter to maintain the allowable noise threshold. Once the edge enclosure 102 leaves the task location 112, the chassis manager 114 may reverse the parameter modification. In some examples, network switches of the edge enclosure 102 may be reconfigured to lower link speed of all communication on detecting that the edge enclosure 102 is in the task location 112. The lowering of the link speed may reduce the heat dissipation and the need for higher fan speeds.

Figure 4:
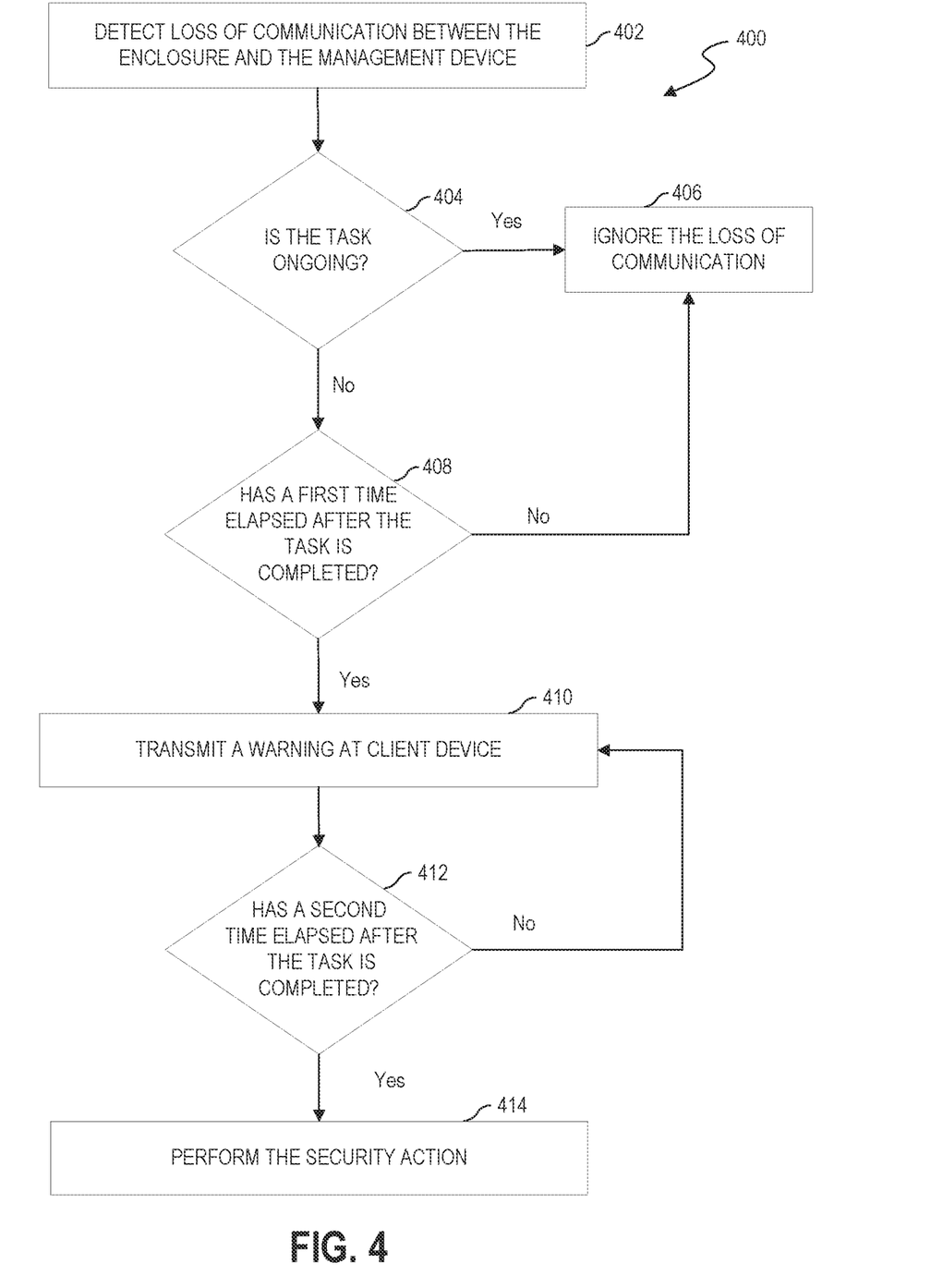
FIG. 4 is a flow diagram of another example method for managing security of edge enclosure.

FIG. 4 is a flow diagram of another example method 400 for managing the security of an edge enclosure such as the edge enclosure 102 of FIG. 1. For illustration purposes, the method 400 is described in conjunction with FIG. 1. The method 400 may be implemented in the form of executable instructions stored on a machine-readable medium 120 and executed by a processor 118 in the chassis manager 114 described earlier. At block 402, the chassis manager 114 may determine a loss of communication between the chassis manager 114 and the management device 104. The chassis manager 114 may monitor the state of connectivity with the management device 104 during the task. The loss of connectivity may be temporary or for a long period. The chassis manager 114 may determine that the edge enclosure 102 is lost or compromised based on the status of the task and the geographical location of the edge enclosure 102.

At block 404, the chassis manager 114 may determine if the task is ongoing. If the task timer is active, the task is in progress and the status of the task is considered as ongoing. If the chassis manager 114 determines that the status of the task is ongoing based on the task timer, the chassis manager 114 may ignore (at block 406) the loss of connectivity to the management device 104. Similarly, at the management device 104, the loss of connectivity between the chassis manager 114 and the management device 104 may be ignored. The management device 104 may determine that the task is active and does not send alerts to the customer. The management device 104 may send alerts once the task is complete. At block 404, if the chassis manager 114 determines that the task is not ongoing, there are chances that the edge enclosure 102 is either on its way back to the base location 110 or it's lost and/or has been compromised. If the task timer is not active, the status of the task is considered as completed.

At block 404, when it is determined that the task is not ongoing, the chassis manager 114 may be configured to determine if a first time and/or a second time has elapsed after the task is completed. Based on the task being performed at the edge enclosure 102, the first time and the second time may be preconfigured at the task manager 126 by the management device 104. The first time and the second time may be defined as minutes, hours, and even days based on the task, the sensitivity of the data being processed, the task location 112, or other task-related details. For example, at block 408, the chassis manager 114 may perform a check to determine whether the first time has elapsed after the task is completed. At 408, if the chassis manager 114 determines that the first time has not elapsed, the chassis manager 114 may continue to ignore the lack of communication between the chassis manager 114 and the management device 104.

In some examples, the first time may be defined to accommodate a delay of the edge enclosure 102 in returning to the base location 110 from the task location 112. At block 408, if the chassis manager 114 determines the first time has elapsed after the task is completed, the chassis manager 114 may transmit (at block 410) a late warning message to the client device 106 of the end-user 108. Similar to the warning message transmitted by the chassis manager 114, the management device 104 may transmit a late warning message to a customer of the edge enclosure 102 when there is no communication between the chassis manager 114 and the management device 104 after the first time has elapsed.

Further, at block 412, the chassis manager 114 may perform a check to determine if the second time has elapsed after the task is completed. At 412, if the chassis manager 114 determines that the second time has not elapsed after the task is completed, the chassis manager 114 may continue to transmit the warning message to the customer. At 412, if the chassis manager 114 determines that the second time has elapsed after the task has been completed, the chassis manager 114 performs the security action (at block 414). In some examples, the security action is performed to prevent access to the data processed by server 116. In some cases, the network access to the server 116 can be disabled. In other cases, the server 116 may be powered-off by the chassis manager 114. In some examples, during or after the execution of the security action, the management device 104 may transmit an edge enclosure missing notification to the customer of the edge enclosure 102. The edge enclosure missing notification may indicate that the edge enclosure 102 is lost or has been compromised. For example, if the edge enclosure 102 is on a 7-day mission, the chassis manager 114 may transmit a late warning message to the client device 106 of the end-user 108 three days (e.g., the first time) after the task is completed. The chassis manager 114 may initiate the security action at the edge enclosure 102 five days (e.g., the second time) after the task is completed.

In some examples, the end-user 108 in communication with the edge enclosure 102 may receive a task extension key from the administrator of the management device 104. The end-user 108 may use the task extension key to reset the task timer at the chassis manager 114. The resetting of the task timer may allow the server 116 at the edge enclosure 102 to remain operational even after the task completion time without raising an alert. In some examples, the management device 104 may be aware of the fact that the edge enclosure 102 is operating outside the task completion time. The management device 104 is aware that the task extension key is provided to an edge enclosure 102 that may be lost, compromised, or stolen.

In some examples, when the edge enclosure 102 is present in the task location 112, the edge enclosure 102 may lose connectivity due to the terrain conditions at the task location 112 during the mission. The chassis manager 114 and the management device 104 may ignore the loss of connectivity until the task timer is active. This prevents unnecessary alerts from being sent to the customers from the management device 104 and unnecessary security action from being performed at the edge enclosure 102. In case the second time has elapsed and the chassis manager 114 has not established communication with the management device 104, the edge enclosure 102 may have been captured by an adversary at the task location 112. Further, in some examples, the status of the task may be transmitted to the OS 134 of the server 116. When the second time has elapsed after the task is completed, the server 116 may disable administrator login to the manageability controller 136 and the OS 134. This prevents any tampering or access to the data in the server 116.

Figure 5:
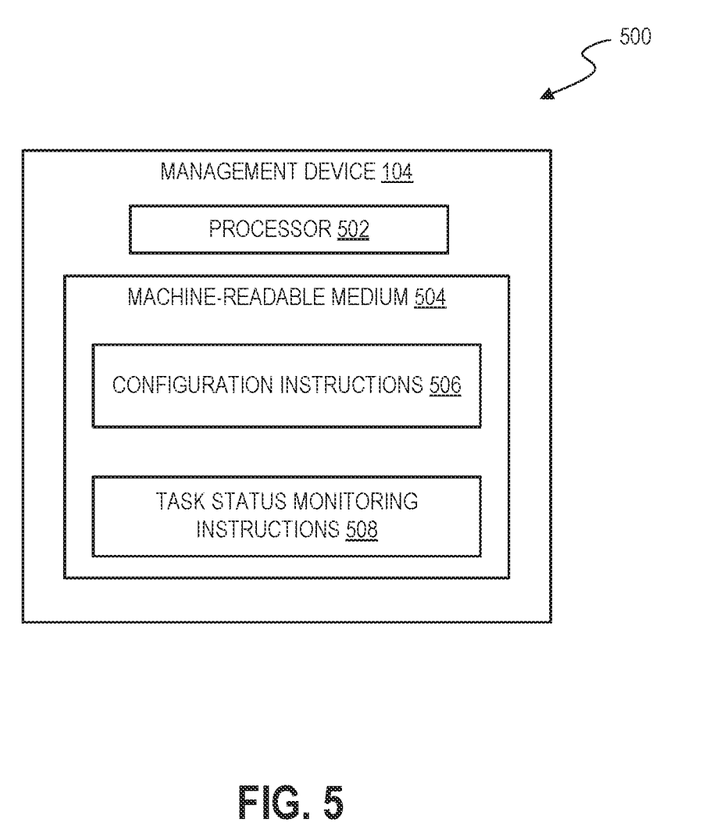
FIG. 5 is a block diagram of an example management device.

FIG. 5 is a block diagram of an example management device, such as the management device 104 in the edge enclosure 102. For illustration purposes, FIG. 5 is explained in conjunction with FIG. 1. In some examples, the management device 104 may include a processor 502 operatively coupled to a machine-readable medium 504 storing executable program instructions. The processor 502 of the management device 104 may be implemented as one or more microprocessors, microcomputers, microcontrollers, digital signal processors, central processing units, state machines, logic circuitries, and/or any devices that manipulate signals based on operational instructions. The processor 502 may be configured by an administrator of the management device 104 to manage the security of the edge enclosure 102 while performing tasks in remote locations. The machine-readable medium 504 may include any non-transitory computer-readable medium including, for example, volatile memory (e.g., RAM), and/or non-volatile memory (e.g., EPROM, flash memory, a hard disk drive, etc.) The machine-readable medium 504 may be encoded with executable instructions 506 and 508 (hereinafter collectively referred to as instructions 506-508) for managing the security of the edge enclosure 102, for example, at the management device 104. For illustration purposes, FIG. 5 is explained in conjunction with FIG. 1.

The processor 502 may be coupled to the machine-readable medium 504. The processor 502 may be configured to execute instructions 506-508 (e.g., programming or software code) stored in the machine-readable medium 504 for managing the security of the edge enclosure 102. In certain examples, as an alternative or in addition to retrieving and executing the instructions 506-508, the processor 502 may include at least one integrated circuit, other control logic, other electronic circuits, or combinations thereof that include a number of electronic components for performing the functionalities intended to be performed by the management device 104.

The instructions 506, when executed by the processor 502, may cause the processor 502 to configure the edge enclosure 102 for the task. In some examples, the configuration of the edge enclosure 102 may be performed at the base location 110 before the edge enclosure 102 is moved to the task location 112 for collecting and processing data associated with the task.

The instructions 508, when executed by the processor 502, may cause the processor 502 to monitor the status of the task. In some examples, the processor 502 may configure the task manager 126 of the edge enclosure 102 with task details and the status of the task to be monitored. The processor 502 may execute task status monitoring instructions when a task is initiated (e.g., based on the task initiation times). The processor 502 is configured to determine if the task is ongoing or if the task is completed (as per a task completion time). In some examples, the task completion time is a predicted task completion time stored at the management device 104. The management device 104 may be configured to detect if the first time has elapsed post the task completion time. Once the first time has elapsed post the task completion time, the management device 104 transmits a "late" warning message to an entity associated with the edge enclosure 102, In an example, the entity may be a customer associated with the task being performed. In another example, the entity may be an owner of the edge enclosure 102. Further, the management device 104 may detect if a second time has elapsed post the task completion time to transmit a "missing" notification to the customer. For example, if the edge enclosure 102 is on a 7-day mission, the administrator of the management device 104 may flag the late warning three days (e.g., the first time) after the 7 days (e.g., the task completion time) and transmit the missing notification to the customer if the edge enclosure 102 does not establish communication with the management device 104 five days (e.g., the second time).

Figure 6:
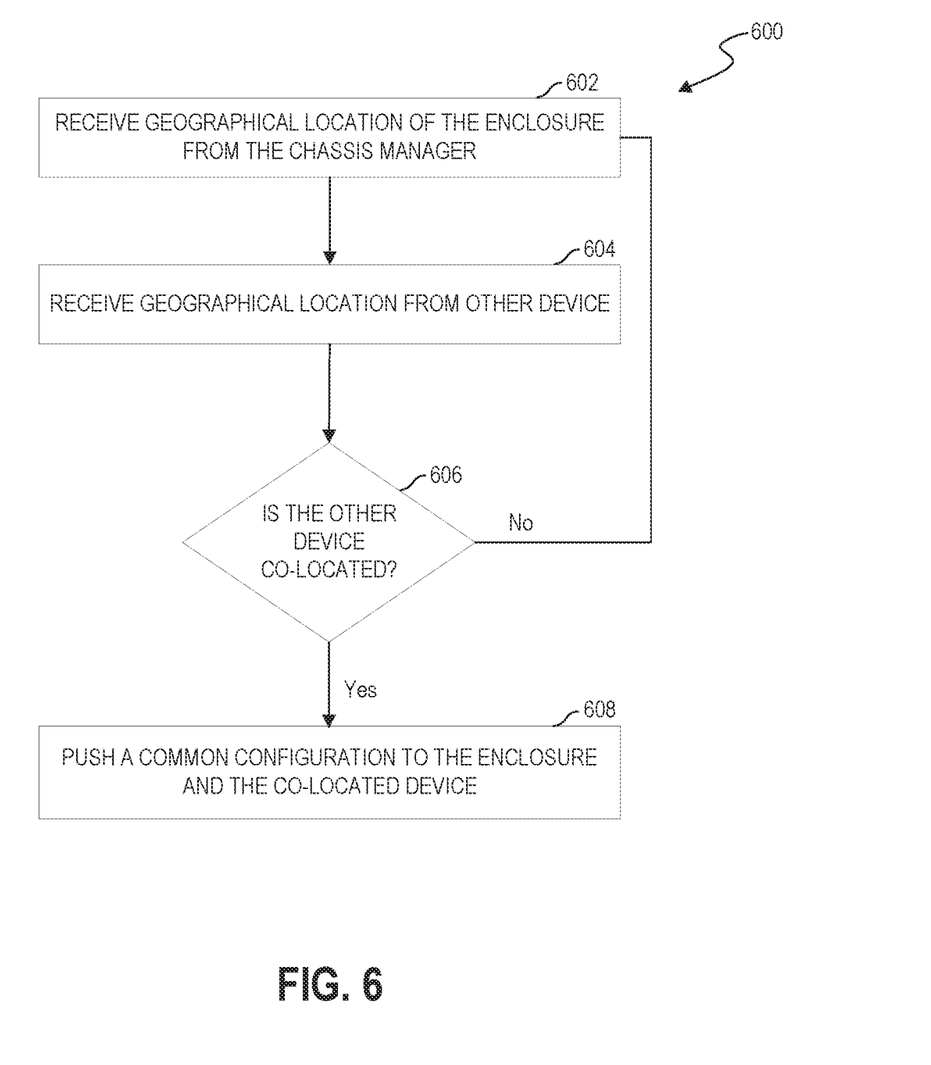
FIG. 6 is a flow diagram of an example method for configuring co-located devices.

FIG. 6 is a flow diagram of an example method 600 for configuring co-located devices by a management device such as the management device 104 of FIG. 1. The method 600 may be implemented in the form of executable instructions stored on the machine-readable medium 504 and executed by the processor 502 in the management device 104 as described in FIG. 5. For illustration purposes, the method 500 is described in conjunction with FIGS. 1 and 5.

At block 602, the management device 104 may receive the geographical location of the edge enclosure 102 periodically from the chassis manager 114. At block 604, the management device 104 may receive geographical location from other devices. In some examples, the other devices may be client devices, servers, edge enclosures, or any other type of computing device. The other devices may be devices that are deployed by the customer of the edge enclosure 102. In some cases, the other devices may be present in the same geographical location (e.g., the base location 110).

At block 606, the management device 104 may perform a check to determine if a device is co-located to the edge enclosure 102. The management device 104 may identify that the device is co-located with the edge enclosure 102 based on the geographical location received from the edge enclosure 102 and location information associated with other devices present at the geographical location of the edge enclosure 102. The management device 104 may maintain the location information of each device that is configured and deployed by the management device 104. If the edge enclosure 102 and the device share the same geographical location, they are considered to be co-located with each other.

At block 608, the management device 104 may push a command configuration to the edge enclosure 102 and the co-located device for future tasks. The management device 104 may determine information of the co-located device from its database. In some examples, the management device 104 may use the geographic location of the edge enclosure 102 to identify a device that shares the same geographical location. In some examples, the management device 104 may determine that the co-located device is being used for performing similar tasks at the same task location 112 and push the command configuration to the edge enclosure 102 and the device that is co-located to the edge enclosure 102 for future tasks. For example, a task may be planned in which both the edge enclosure 102 and the co-located device may be configured to operate similarly.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described. Thus, features described with reference to one or more implementations can be combined with other implementations described herein.

What is claimed is:

1. A method comprising:
   detecting, by a chassis manager of an edge enclosure, a loss of communication between the chassis manager and a management device;
   determining, by the chassis manager, a status associated with a task, wherein the task is executed by a server hosted in the edge enclosure; and
   in response to detecting the loss of communication and based on at least one of the status of the task or a geographical location of the edge enclosure, performing, by the chassis manager, a security action at the edge enclosure, wherein the geographical location is received from a receiver in the edge enclosure,
   wherein the edge enclosure is deployed in a mobile environment in which the edge enclosure moves from a base location to a task location during the task.

2. The method of claim 1, wherein determining the status associated with the task further comprises determining whether the task is ongoing or completed, wherein the status of the task is determined using at least one of a task initiation time, a task completion time, or task timer.

3. The method of claim 2, further comprising:
   determining, by the chassis manager, whether the task is ongoing; and
   in response to determining that the task is ongoing, ignore loss of communication between the chassis manager and the management device.

4. The method of claim 2, further comprising:
   determining, by the chassis manager, whether a first time has elapsed after the task is completed; and
   in response to determining that the first time has elapsed, transmitting, by the chassis manager, a late warning message to a client device of an end-user.

5. The method of claim 2, further comprising determining, by the chassis manager, whether a second time has elapsed after the task is completed, wherein the security action is performed in response to detecting that the second time has elapsed after the task is completed.

6. The method of claim 1, wherein performing the security action comprises at least one of powering off the server, preventing network access to the server, disabling internal switch port associated with the server.

7. The method of claim 1, further comprising transmitting, by the chassis manager, the geographical location of the edge enclosure to the server, wherein the server prevents access to a manageability controller and an operating system of the server based on the geographical location of the edge enclosure.

8. The method of claim 1, further comprising:
   determining, by the chassis manager, that the edge enclosure is present at the task location; and
   in response to determining that the edge enclosure is present at the task location, transmitting, by the chassis manager, instructions for modifying an operating parameter of a hardware device connected to the edge enclosure.

9. The method of claim 1, further comprising transmitting, by the chassis manager, the geographical location of the edge enclosure to the management device, wherein the management device uses the geographical location to identify and configure a co-located device for future tasks.

10. A chassis manager deployed in an enclosure, the chassis manager comprising:
    a machine-readable medium that stores program instructions; and
    a processor operatively coupled to the machine-readable medium, wherein the processor executes the program instructions to:
    detect a loss of communication between the chassis manager and a management device;
    determine a status associated with a task being executed by a server hosted in the enclosure, wherein the server is communicatively coupled to the chassis manager; and
    in response to detecting the loss of communication and based on at least one of the status of the task or a geographical location of the edge enclosure, perform a security action at the enclosure, wherein the geographical location is received from a receiver in the edge enclosure,
    wherein the enclosure is deployed in a mobile environment in which wherein the enclosure moves from a base location to a task location during the task.

11. The chassis manager of claim 10, wherein the status of the task is determined as ongoing or completed based on at least one of a task initiation time, a task completion time, or a task timer.

12. The chassis manager of claim 11, wherein the machine-readable medium stores additional instructions that when executed by the processor, cause the processor to:
   determine whether the task is ongoing; and
   in response to determining that the task is ongoing, ignore loss of communication between the chassis manager and the management device.

13. The chassis manager of claim 12, wherein the machine-readable medium further stores additional instructions that when executed by the processor, cause the processor to:
   determine whether a first time has elapsed after the task is completed; and
   in response to determining that the first time has elapsed, transmit a late warning message to a client device of an end-user.

14. The chassis manager of claim 11, wherein the machine-readable medium further stores additional instructions that when executed by the processor, cause the processor to:
   transmit a message indicating the loss of communication between the chassis manager and the management device after the task is completed to the server in the enclosure, wherein the server prevents access to a manageability controller and an operating system of the server.

15. The chassis manager of claim 10, wherein the machine-readable medium further stores additional instructions that when executed by the processor, cause the processor to:
   determine whether a second time has elapsed after the task is completed; and
   in response to determining that the second time has elapsed, perform the security action at the enclosure.

16. The chassis manager of claim 10, wherein the security action performed comprises at least one of powering off the server, preventing network access to the server, or disabling internal switch port associated with the server.

17. The chassis manager of claim 10, wherein the machine-readable medium further stores additional instructions that when executed by the processor, cause the processor to:
   determine that the enclosure is present at the task location; and
   in response to determining that the enclosure is present at the task location, transmit instructions for modifying an operating parameter of a hardware device connected to the enclosure.

18. A management device in communication with an enclosure, the management device comprising:
   a machine-readable medium that stores program instructions; and
   a processor operatively coupled to the machine-readable medium, wherein the processor executes the program instructions to:
      determine whether a first time has elapsed post a task completion time, wherein a task is to be executed by a server hosted in the enclosure;
   in response to determining that the first time has elapsed after the task completion time, transmit a late warning message to an entity associated with the enclosure;
   determine whether a second time has elapsed after the task completion time; and
   in response to detecting that the second time has elapsed after the task completion time, transmit an alert to the entity indicating that the enclosure is lost or compromised after the second time.

19. A management device in communication with an enclosure, the management device comprising:
   a machine-readable medium that stores program instructions; and
   a processor operatively coupled to the machine-readable medium, wherein the processor executes the program instructions to:
      determine whether a first time has elapsed post a task completion time, wherein a task is to be executed by a server hosted in the enclosure;
   in response to determining that the first time has elapsed after the task completion time, transmit a late warning message to an entity associated with the enclosure;
   receive a geographical location of the enclosure from a chassis manager of the enclosure;
   determine if a device is co-located with the enclosure based on the geographical location received from the enclosure and a geographical location received from the device; and
   in response to determining that the device is co-located with the enclosure, pushing by the management device a command configuration to the enclosure and the device for a future task.

* * * * *